United States Patent
Bennett et al.

(10) Patent No.: US 9,582,407 B2
(45) Date of Patent: Feb. 28, 2017

(54) SECURITY ROLE TESTING USING AN EMBEDDABLE CONTAINER AND PROPERTIES OBJECT

(75) Inventors: Paul W. Bennett, Round Rock, TX (US); Elisa Ferracane, Austin, TX (US); William J. O'Donnell, Fichburg, WI (US); Michael C. Thompson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 812 days.

(21) Appl. No.: 13/034,907

(22) Filed: Feb. 25, 2011

(65) Prior Publication Data

US 2012/0222015 A1    Aug. 30, 2012

(51) Int. Cl.
*G06F 9/44* (2006.01)
*G06F 11/36* (2006.01)
*G06F 21/62* (2013.01)

(52) U.S. Cl.
CPC ....... *G06F 11/3688* (2013.01); *G06F 21/6218* (2013.01)

(58) Field of Classification Search
USPC ........................................... 717/127
See application file for complete search history.

(56) References Cited

U.S. PATENT DOCUMENTS

| 7,131,000 B2 | 10/2006 | Bradee |
| 2003/0093717 A1* | 5/2003 | Mason ............................ 714/38 |
| 2003/0149893 A1* | 8/2003 | Chang et al. ................. 713/201 |
| 2003/0200526 A1 | 10/2003 | Arcand |
| 2004/0054696 A1 | 3/2004 | Sheinis et al. |
| 2005/0138426 A1* | 6/2005 | Styslinger ..................... 713/201 |
| 2006/0026667 A1* | 2/2006 | Bhide et al. ...................... 726/1 |

* cited by examiner

*Primary Examiner* — Hang Pan
(74) *Attorney, Agent, or Firm* — Stephen J. Walder, Jr.; Richard A. Wilhelm

(57) ABSTRACT

Mechanisms are provided for performing security role definition testing. An application is received in a container of a runtime environment of the data processing system. The application has methods and security role definitions associated with the methods. A properties object, which specifies a user identifier to security role mapping, is received in the container. A test application is executed, in the container, by the processor, on an execution of the methods of the application based on the user identifier to security role mapping and the security role definitions. The test application tests an operation of the application with regard to the security role definitions. A result of the execution of the test application on the execution of the methods of the application is then output.

16 Claims, 4 Drawing Sheets

```
import java.util.HashMap;
import java.util.Map;
import javax.ejb.EJBContainer;
import my.pkg.MyBeanIface;      // this is the local business interface of the
                                // enterprise bean public class EmbeddableContainerSample { public static void main(String[] args) throws Throwable {
        // Create a properties map to pass to the embeddable container:
        Map<String,Object> properties = new HashMap<String,Object>();
        // Specify that you want to use the WebSphere embeddable container:
        properties.put(EJBContainer.PROVIDER,
            "com.ibm.websphere.ejbcontainer.EmbeddableContainerProvider");
        // Specify that you want security checking enabled:
        properties.put("com.ibm.websphere.securityEnabled", "true");
        // Assign the users bob, fred, and mary to the role employee:
        props.put("role.employee", "bob, fred, mary");
        // Assign the user fred to the role manager:
        props.put("role.manager", "fred");
        // The user fred will be used for the runAs role manager:
        props.put("role.runAs.manager", "fred");
        // The user fred will be used for role authorization when invoking
        // methods on the EJB:
        props.put("user.invocation", "fred");
        // Create the container instance, passing it the properties map:
        EJBContainer ec = EJBContainer.createEJBContainer(properties);
        // Use the container context to look up a bean:
        MyBeanIface bean = ec.getContext().lookup("java:global/MyEJBModule/
            MyBean!my.pkg.MyBeanIface");
        // Invoke a method on the bean instance:
        bean.doStuff();
        ...
        // Close the embeddable container:
        ec.close();
    }
}
```

Labels: 410, 420, 430, 440, 450, 460

*FIG. 4*

SECURITY ROLE TESTING USING AN EMBEDDABLE CONTAINER AND PROPERTIES OBJECT

BACKGROUND

The present application relates generally to an improved data processing apparatus and method and more specifically to mechanisms for performing security role testing using an embeddable container and properties object.

One of the application program interfaces (APIs) available in the Java programming language is the Enterprise Java Bean (EJB). EJB was originally developed by International Business Machines Corporation of Armonk, N.Y., in 1997 and later adopted by Sun Microsystems in 1999. EJB is a server-side model that encapsulates the business logic of an application and thus, provides a managed, server-side component architecture for modular construction of enterprise applications. The EJB specifications provide a standard way to implement the back-end business code typically found in enterprise applications, as opposed to front-end interface code. EJBs are intended to handle concerns that are common to enterprise application code such as persistence, transaction integrity, and security in a standard way leaving programmers free to concentrate on the particular problems to be addressed by the enterprise application.

EJB applications contain security role information for each method in the EJB. This security role information defines what security roles are permitted to execute the particular method. Thus, if a user has a first security role and attempts to execute methods in an EJB, the first security role may be compared against the security role information defined for the methods of the EJB and determine which methods of the EJB may be executed by this user and which cannot. Thus, the user with the first security role may be able to execute a first set of methods of the EJB and a second user having a second, and different, security role may be able to execute a second set of methods of the EJB which may be different from the first set of methods of the EJB.

Currently, there is no efficient way for Java developers who are developing EJBs that utilize security roles to test the correctness of the role security definitions in the EJB. That is, with the current developer environment, in order for an EJB developer to test the EJB's security role definitions, the EJB developer must perform the following operations:

(1) install a Java Enterprise Edition (JEE) application server, such as Websphere available from International Business Machines Corporation;

(2) start the application server;

(3) configure the application server to have security enabled and have a user registry;

(4) define the necessary users, groups, and passwords in the user registry;

(5) install the EJB application on the application server;

(6) map the EJB's security role definitions to users and/or groups in the user registry;

(7) start the EJB application on the application server;

(8) invoke another program, such as a servlet, to supply a valid user id and password which then invokes the EJB application (if an invalid user id and password is entered, then another user id and password is entered and the process repeated until a correct user id and password are entered); and (9) examine the output of the EJB application, or the application server logs, to look for any messages indicating a security violation while invoking the EJB application's methods. For any subsequent changes made to the EJB's security roles, the EJB developer must uninstall the EJB application from the JEE application server and then repeat steps 5 through 9 above for the updated EJB application.

As can be seen from the above, this process for verifying that the security role definitions of an EJB application are coded can be very slow and cumbersome, especially during the early stages of the EJB development lifecycle. As a result, EJB developers have a tendency to perform security role testing at a later phase of the EJB development lifecycle which adds to the development cost for developing an EJB application.

SUMMARY

In one illustrative embodiment, a method, in a data processing system, is provided for performing security role definition testing. The method comprises receiving, in a container of a runtime environment of the data processing system, an application having one or more methods and one or more security role definitions associated with the one or more methods. The method further comprises receiving, in the container, a properties object specifying a user identifier to security role mapping. Moreover, the method comprises executing, in the container, by the processor, a test application on an execution of the one or more methods of the application based on the user identifier to security role mapping and the security role definitions. The test application tests an operation of the application with regard to the security role definitions. In addition, the method comprises outputting a result of the execution of the test application on the execution of the one or more methods of the application.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 is an example diagram of code for testing EJB security role assignments in accordance with one illustrative embodiment.

DETAILED DESCRIPTION

Figure 1:
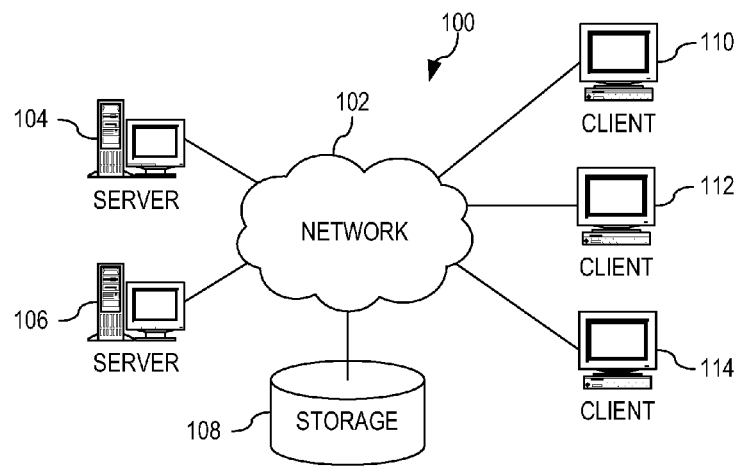
FIG. 1 is an example diagram of a distributed data processing system in which aspects of the illustrative embodiments may be implemented.

The illustrative embodiments provide mechanisms for performing security role testing using an embeddable container and properties object. With the mechanisms of the illustrative embodiments, an EJB application may be loaded into an EJB container that provides functionality for testing an EJB application directly within a Java Virtual Machine (JVM). The EJB container is configured to receive a properties object that programmatically maps roles to users and specifies a particular userid to be used by the EJB application. The properties object may then be used within the EJB container to test the EJB application's security role definitions with the EJB container receiving an exception if there is a security error and an output notification can be presented to the EJB developer.

With these mechanisms, no longer must an EJB developer install, start, and configure a JEE application server in order to test the security role definitions of an EJB application since the testing can be performed directly in the JVM. Moreover, there is no requirement that the JEE application server be configured to have security enable and have a user registry. Furthermore, there is no requirement that the EJB developer define users, groups, and passwords in a complex user registry since a user registry is not utilized and instead a very simple properties object is used. In addition, there is no requirement to install the EJB application in the JEE application server, map EJB security role definitions to users specified in the user registry, or invoke a separate program to supply a valid user id and password. To the contrary, passwords are not even required with the mechanism of the illustrative embodiments.

Among the advantages of the illustrative embodiments is that an EJB developer can quickly and easily modify the security properties to test different security setups and rerun the EJB application without uninstalling, re-installing, or reconfiguring the testing environment. To the contrary, with the mechanisms of the illustrative embodiments, changes can be made to the EJB application and the EJB application need only be recompiled and the EJB container's test applications invoked again. Similarly, if one wishes to make changes to the security roles being tested, one need only modify the simple properties object without having to reconfigure a complex user registry with new user ids, passwords, groups and the like, and then recomputed the mappings of users to security roles using the reconfigured user registry.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
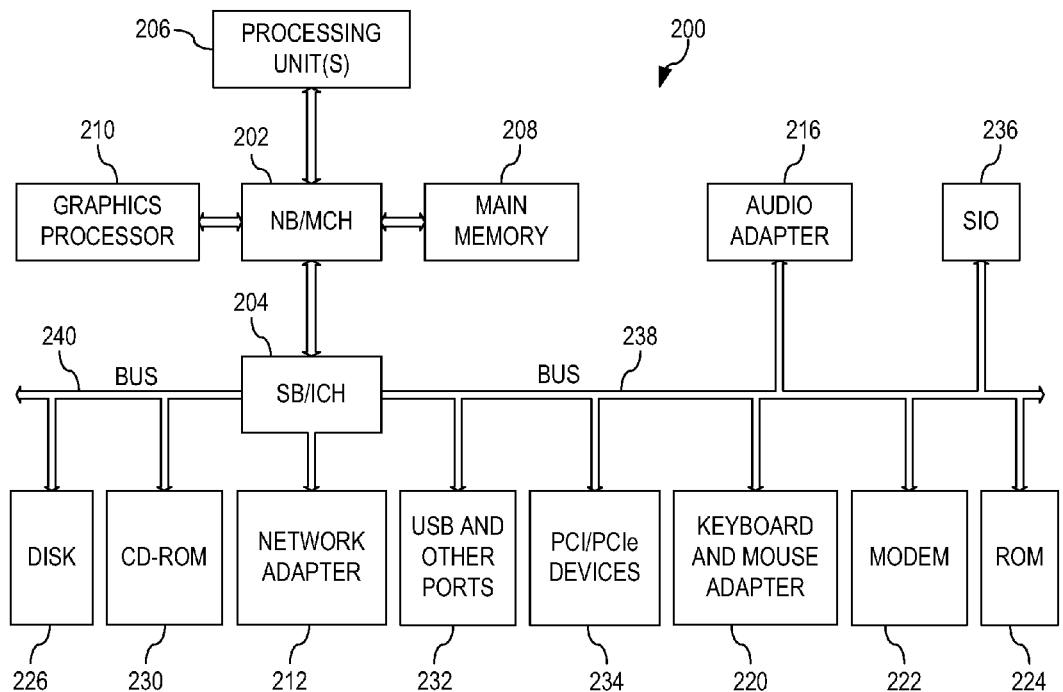
FIG. 2 is an example block diagram of a data processing system in which aspects of the illustrative embodiments may be implemented.

The illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft Windows 7 (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (Java is a trademark of Oracle and/or its affiliates.).

As a server, data processing system 200 may be, for example, an IBM® eServer™ System p® computer system, running the Advanced Interactive Executive (AIX®) operating system or the LINUX operating system (IBM, eServer, System p, and AIX are trademarks of International Business Machines Corporation in the United States, other countries, or both, and LINUX is a registered trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

With reference again to FIG. 1, the illustrative embodiments may be implemented, for example, on a server computing device, such as server 104 or 106, a client computing device, such as client 110, 112, or 114, or a combination of a server computing device and a client computing device. Alternatively, the illustrative embodiments may be implemented entirely within a stand-alone computing device. For purposes of the following description, it will be assumed that the illustrative embodiments are implemented in a server computing device that is accessible by a Enterprise Java Bean (EJB) application developer via a client computing device or the like.

The server computing device provides a Java Virtual Machine (JVM) and an EJB container that provides Java test applications that may be invoked within the JVM. The test applications in the EJB container may invoke an EJB application directly in the JVM to perform the testing on the EJB application. In the illustrative embodiments, the testing of the EJB application includes performing security role definition testing using a properties object that specifies a mapping of user ids to roles and the particular user id(s) to use to test the EJB application. In one illustrative embodiment, a single user id to use to test the EJB application is specified and the properties object is modified each time a new user id is to be tested. In another illustrative embodiment, a plurality of user ids to test may be specified in the properties object. The particular EJB application to be tested as well as the properties object may be provided by the EJB developer via a client computing device, or otherwise created on the server computing device by the EJB developer via the client computing device, for example.

The EJB application may be loaded into the EJB container and the properties object may be passed into the EJB container for use in testing the EJB application with regard to specific security roles. The EJB application may then generate outputs which are intercepted by the test applications of the EJB container. These outputs may include an exception in the case of a security violation or error. For example, with a declarative security, i.e. method level roles, if a user id is not in a particular role, an exception is thrown indicating that the user id is not authorized to a given role. In the case of an exception, the EJB container may output a notification which may be logged or otherwise provided to the client computing device of the EJB developer so that the EJB developer can determine if the EJB application is operating properly, especially with regard to security role definitions.

In another illustrative embodiment, using programmatic security, messages may not be logged but instead, a true or false indication may be generated when the Java program calls an appropriate method or API, e.g., isCallerInRole (myrole) API. These indications may be captured using programmatic techniques, such as trace hooks or the like.

Figure 3:
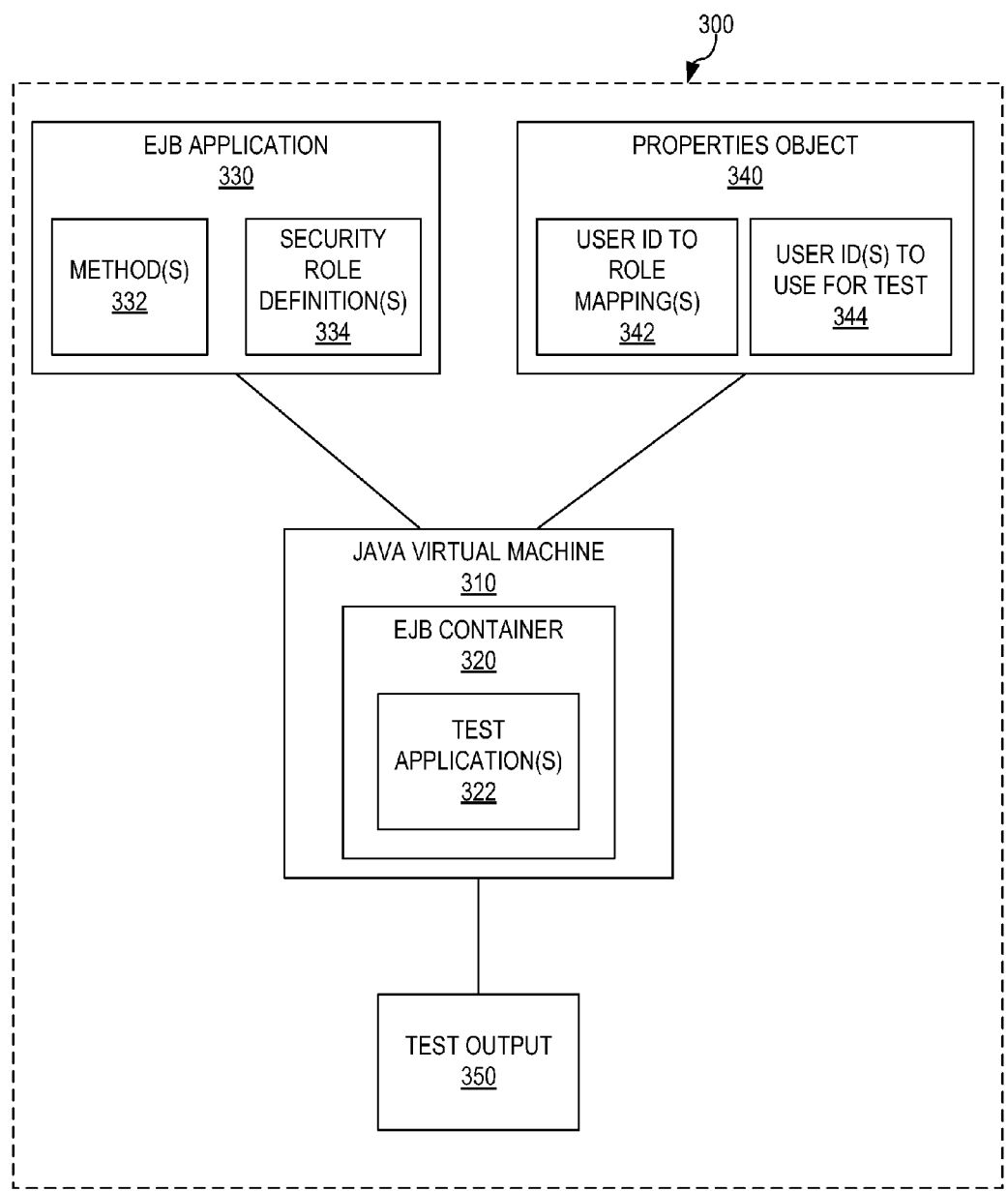
FIG. 3 is an example block diagram illustrating the primary operational elements of one illustrative embodiment.

FIG. 3 is an example block diagram illustrating the primary operational elements of one illustrative embodiment. The elements shown in FIG. 3 may be implemented within a development environment on a computing device. For example, the elements in FIG. 3 may be implemented in a server computing device, such as server 104 or 106 in FIG. 1. In one illustrative embodiment, one or more elements in FIG. 3, such as the EJB application 330 and/or properties object 340, may be provided to the server computing device from an external source, such as a client computing device, another server computing device, or the like.

As shown in FIG. 3, the development environment 300 includes a Java Virtual Machine (JVM) 310 into which an Enterprise Java Bean (EJB) container 320 is loaded. The EJB container 320 is an embeddable container. That is, the EJB container 320 is a runtime environment that allows an application to be run without having to install the application in an application server, bring up the application server, and then deploy the application into the application server. The EJB container 320 includes one or more test applications 322 for testing the operation of EJB applications loaded into the EJB container 320. The test applications 322 may be run on the EJB applications to test various aspects of the operation of the EJB applications including the use of security roles and security role definitions within the EJB applications.

The EJB container 320 receives an EJB application 330 and a properties object 340 for use in testing the operation of the EJB application 330 within the runtime environment of the EJB container 320. The EJB application 330 includes a one or more methods 332 and associated security role definitions 334. The security role definitions specify the security roles utilized by the EJB application and may further identify, for each method in the methods 332, which security roles are permitted to execute the methods.

The properties object 340 includes user id to security role mappings 342 that identifies one or more user ids and their associated security roles, e.g., "user", "administrator," or the like. In addition, the properties object 340 may include an identifier of one or more particular user ids to use for a current test of the EJB application 330. In one illustrative embodiment, the user id to use for the test 344 comprises a single user id. In such a case, if an EJB developer wants to test multiple user ids, the EJB developer need only update this one portion 344 of the properties object 340 and re-load the properties object 340 into the EJB container 320. In another illustrative embodiment, the user id to use for the test 344 may comprise a plurality of user ids that may be tested sequentially by the test applications 322 of the EJB container 320 on the EJB application 330, thereby eliminating the need for an EJB developer to modify the user id to use for test 344 portion of the properties object 340 to test multiple user ids and security roles.

The properties object 340 differs from a registry, as used in known systems, in very important ways. A registry is a data structure, such as a data structure of a database, which has to be setup, i.e. populated with users, groups, and passwords. For example, the registry may be a complex data structure stored in a LDAP server, a computer file containing user ID and password information, or the like. When an application is installed into an application server, the application's roles must be mapped to the users or groups that are specified in the registry. Thus, for example, when one installs an application that has the role "manager", one must map the role "manager" to a user or group in the registry. Furthermore, if one enters an invalid user id or group id when specifying the mapping, an error is encountered and the testing of the application cannot proceed.

With the properties object 340, on the other hand, no setup is necessary. One need only type in any user or group name one wants to use when testing the security of the application. Thus, the complex registry setup operations are avoided and a class of errors, e.g., entering invalid group or user ids, is avoided.

The test applications 322 of the EJB container 320 may be executed on the methods 332 of the EJB application 330 in accordance with the security role definitions 334 of the EJB application 330 and the user id to security role mappings 342 and user id(s) to use for test 344 specified in the properties object 340. The EJB application 330 is executed within the EJB container 320 and each time a method 332 is invoked in the embeddable EJB container 320 the input properties, such as from the properties object 340, are checked to see if an invocation user id is supplied, such as by the user id(s) to use for test 344. If an invocation user id is present, then a Subject is created with the user id without any verification of the user id against any user registry and no password is required or used. In the prior art mechanisms, a Subject is only created after a user id is verified against a pre-established and pre-configured user registry. The Subject is a standard Java object construct representing a user and thus, a more detailed explanation of Subject objects is not included herein.

The user id to security role mappings 342 of the input properties from the properties object 340 are further used to determine if the user id can be used to execute methods of the EJB application 330. For example, a user id specified in the user id(s) to use for test 344 portion of the properties object 340 may be correlated with a security role by using the user id to security role mappings 342. The security role for the user id may then be compared against the security role definitions 334 of the EJB application 330 to determine if particular methods 332 within the EJB application 330 may be executed by the user id 344. A log of which methods are executed and which are not under the user id 344 may be created by the test applications 322 and output as test output 350. Alternatively, only security violations may be output as part of the test output 350, e.g., a user id 344 attempting to execute a method 332 for which the user id 344 does not have the required security role. The test output 350 may comprise a writing of data to a file, an output of a notification message to a client computing device or other computing device used by the EJB developer, or the like.

From the above, it can be seen that the EJB container 320 is configured in such a manner as to receive as input the EJB application 330 and properties object 340 and run test applications 322 on the EJB application 330 based on the input properties from the properties object 340. There are many ways in which the EJB container 320, properties object 340, and EJB application 330 may be implemented.

FIG. 4 is an example diagram of code for testing EJB security role assignments in accordance with one illustrative embodiment. As shown in FIG. 4, a first portion 410 of the EJB container code creates a properties map to pass to the embeddable EJB container. A second portion 420 specifies the embeddable EJB container to be used, in this case a WebSphere embeddable container, as well as specifying that security role checking is to be enabled.

It should be noted that while the properties map is shown as being part of the first portion 410 of the EJB container code, the properties mapping can be provided separately as previously described above. That is, using new Java Enterprise Edition (EE) standards, such as JEE 1.6 standards, the depicted example makes use of a light weight container that does not require an application server, has enough functionality to allow a programmer to test the application, and can be run directly. Using older technology, the illustrative embodiments may be implemented using an application server which contains a full EJB runtime environment container where the properties map may be provided separately to the full EJB runtime environment. Other implementations as will be readily apparent to those of ordinary skill in the art in view of the present description may be used without departing from the spirit and scope of the illustrative embodiments.

Returning again to FIG. 4, in a third portion 430 of the code, the user id to security role mapping is specified in a property object. In a fourth portion 440 of the code, the EJB container instance is created and the properties object is passed to the EJB container instance. A fifth portion 450 of the code uses the EJB container instance to load an EJB application, or simply referred to as an EJB. A sixth portion 460 of the code invokes one or more methods of the EJB application. Since the security role checking is enabled, the EJB container performs security role checking when invoking the one or more methods which includes generating logs and/or notifications of security violations or the like. Thereafter, the EJB container is closed.

Figure 5:
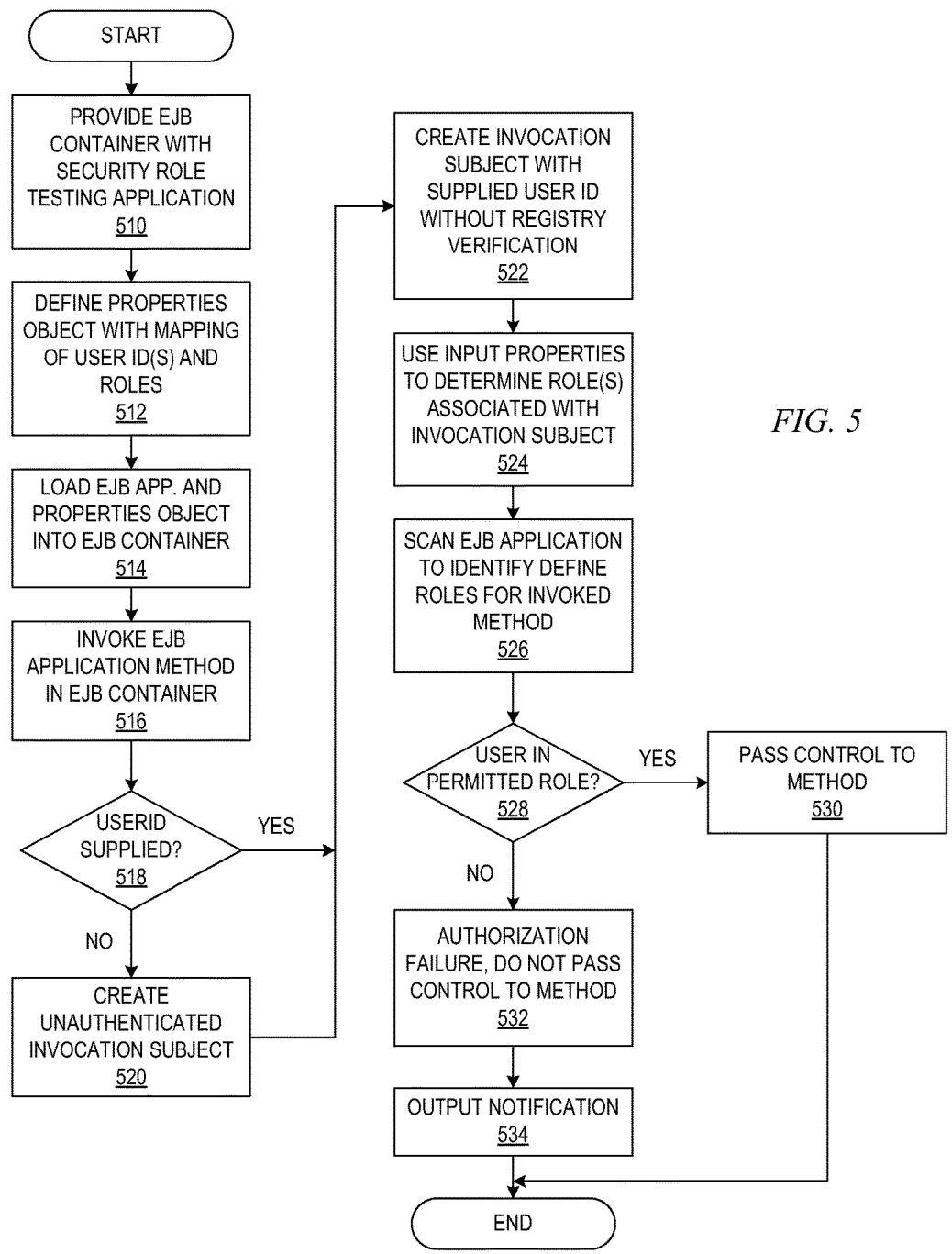
FIG. 5 is a flowchart outlining an example operation for performing security role testing in accordance with one illustrative embodiment.

FIG. 5 is a flowchart outlining an example operation for performing security role testing in accordance with one illustrative embodiment. As shown in FIG. 5, the operation starts by providing, defining, or otherwise identifying an EJB container to use and configuring that EJB container with a security role testing application (step 510). The properties object is defined by specifying the user ids and security role mappings to be included in the properties object and optionally the user id(s) to be used to test the EJB application (step 512). An EJB application and the properties object are loaded into the EJB container (step 514) and a method of the EJB application are invoked within the EJB container (step 516).

For the method invocation, a determination is made as to whether a user id was supplied to be used to test the security role definitions associated with the method (step 518). If not, then an unauthenticated invocation subject is created (step 520). However, if a user id was supplied, such as in the user id(s) to use for test portion 344 of the properties object 340 in FIG. 3, for example, then an invocation subject with the supplied user id is created without having to perform a user registry verification operation (step 522).

The input properties from the properties object are used to determine the security roles associated with the invocation subject, i.e. the user id to be used to test the security roles definitions for the method (step 524). The EJB application is scanned to identify the defined security roles for the invoked method (step 526) and a determination is made as to whether the user id has an associated security role that corresponds to a security role definition associated with the invoked method, i.e. that the user id's security role matches a security role specified in the security role definition of the method indicating that the security role is permitted to execute the method (step 528). If so, then control is passed to the method, i.e. the method is executed (step 530). Otherwise, if the user id's associated security role is not permitted to execute the invoked method, then there is an authorization failure and control is not passed to the method (step 532). A notification, log entry, or the like may be generated and output to identify this security violation so that an EJB developer may determine whether the EJB application needs to be modified or not to address such a security violation. The operation then ends.

It should be appreciated that the operations described above may be repeated for each method in the EJB application. Moreover, the operations described above may be repeated for each user id that is to be used for testing the security role definitions of the EJB application.

Thus, the mechanisms of the illustrative embodiments provide a mechanism for testing security role definitions of portions of an application without having to install an application server, configure the application server, create and configure a user registry, or invoke another program to provide user id and password input. To the contrary, the mechanisms of the illustrative embodiments may operate in a container runtime environment having a test application for testing these security role definitions based on properties passed into the container runtime environment. It should be appreciated that the properties passed into the container runtime environment may be reused for multiple applications, e.g., the properties object 340 can be used with a plurality of different EJB applications 330 with or without modification of the properties object 340. Moreover, modifications to the properties object 340 may be made to one or the other of elements 342 or 344 without having to modify the other element 342 or 344.

While the above illustrative embodiments are described in terms of EJB applications, properties objects, JVMs, and EJB containers, it should be appreciated that the illustrative embodiments are not limited to EJB mechanisms. To the contrary, in other illustrative embodiments, equivalent structures may be provided in other application models that define security roles to protect methods or routines. That is, the illustrative embodiments are independent of the J2EE EJB programming model and can be used in other implementations that do not make use of the J2EE EJB programming model.

Moreover, while the above illustrative embodiments are described in terms of use with the Java object oriented programming language, Java Virtual Machines (JVMs), objects, and the like, the illustrative embodiments are not limited to only being used with Java or these Java constructs. To the contrary, the illustrative embodiments may be used with any known or later developed object-oriented or interpreted programming language. For example, the mechanisms of the illustrative embodiments may be implemented using the Smalltalk programming language, Common Lisp Object System, Visual Basic.Net, C+, or any other object-oriented or interpreted programming language. Various other examples of virtual machines, beyond that of a JVM, that may be used with the illustrative embodiments may include the IBM VM systems, the Parrot virtual machine, the .NET Framework, or the like. In short, in view of the teachings set forth in this detailed description, one of ordinary skill in the art can implement the features of the present invention and the illustrative embodiments set forth above in any known or later developed object-oriented or interpreted language environment.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system having at least one processor, for performing security role definition testing, comprising:

receiving, in a container of a runtime environment of the data processing system, an application having one or more methods and one or more security role definitions associated with the one or more methods;

receiving, in the container, a properties object specifying both a user identifier to security role mapping structure that maps a plurality of user identifiers to corresponding security roles, and one or more test user identifiers to use to test an execution of the one or more methods of the application;

executing, in the container, by the processor, a test application on the execution of the one or more methods of the application based on the user identifier to security role mapping structure in the properties object, the one or more test user identifiers in the properties object, and the security role definitions, wherein the test application tests an operation of the application with regard to the security role definitions by correlating the one or more test user identifiers with corresponding security roles using the user identifier to security role mapping structure and comparing the corresponding security roles of the one or more test user identifiers to the security role definitions associated with the one or more methods; and outputting a result of the execution of the test application on the execution of the one or more methods of the application, wherein the execution of the test application on the execution of the one or more methods of the application comprises:

executing the application within the container;

in response to a method, in the one or more methods, being invoked during the execution of the application, checking input properties from the properties object to determine if an invocation user identifier is supplied by the properties object; and in response to an invocation user identifier being supplied by the properties object, generating a Subject object prior to verification of the invocation user identifier.

2. The method of claim 1, wherein the container is an Enterprise Java Bean (EJB) container and the application is an EJB application.

3. The method of claim 1, wherein the properties object identifies a plurality of test user identifiers to be used by the test application to test the security role definitions associated with the one or more methods, and wherein each test user identifier in the plurality of test user identifiers is used by the test application in a sequential manner to test the security role definitions of the one or more methods.

4. The method of claim 1, wherein the test application determines whether the one or more test user identifiers result in a security role violation for one or more of the one or more methods of the application, based on outputs from the execution of the one or more methods of the application.

5. The method of claim 1, wherein the execution of the test application on the execution of the one or more methods of the application further comprises:

determining one or more security roles associated with the Subject object based on the user identifier to security role mapping;

determining one or more security role definitions associated with the invoked method;

comparing the one or more security roles associated with the Subject object to the one or more security role definitions associated with the invoked method; and generating an output indicative of whether the Subject object has a necessary security role for invoking the invoked method based on results of the comparison.

6. The method of claim 5, wherein the output is an exception indicating a security violation in response to the comparison indicating that the Subject object does not have an associated security role matching one of the one or more security role definitions.

7. The method of claim 1, wherein outputting a result of the execution of the test application on the execution of the one or more methods of the application comprises generating a log of attempted method invocations with associated indications of whether the method invocations resulted in a security role violation or not.

8. A computer program product comprising a non-transitory computer readable medium having a computer readable program stored therein, wherein the computer readable program, when executed on a computing device, causes the computing device to:

receive, in a container of a runtime environment of the computing device, an application having one or more methods and one or more security role definitions associated with the one or more methods;

receive, in the container, a properties object specifying a user identifier to security role mapping structure that maps a plurality of user identifiers to corresponding security roles, and one or more test user identifiers to use to test an execution of the one or more methods of the application;

execute, in the container, a test application on the execution of the one or more methods of the application based on the user identifier to security role mapping structure in the properties object, the one or more test user identifiers in the properties object, and the security role definitions, wherein the test application tests an operation of the application with regard to the security role definitions by correlating the one or more test user identifiers with corresponding security roles using the user identifier to security role mapping structure and comparing the corresponding security roles of the one or more test user identifiers to the security role definitions associated with the one or more methods; and output a result of the execution of the test application on the execution of the one or more methods of the application, wherein the execution of the test application on the execution of the one or more methods of the application comprises:

executing the application within the container;

in response to a method, in the one or more methods, being invoked during the execution of the application, checking input properties from the properties object to determine if an invocation user identifier is supplied by the properties object; and in response to an invocation user identifier being supplied by the properties object, generating a Subject object prior to verification of the invocation user identifier.

9. The computer program product of claim 8, wherein the container is an Enterprise Java Bean (EJB) container and the application is an EJB application.

10. The computer program product of claim 8, wherein the properties object identifies a plurality of test user identifiers to be used by the test application to test the security role definitions associated with the one or more methods, wherein each test user identifier in the plurality of test user identifiers is used by the test application in a sequential manner to test the security role definitions of the one or more methods.

11. The computer program product of claim 8, wherein the test application determines whether the one or more test user identifiers result in a security role violation for one or more of the one or more methods of the application, based on outputs from the execution of the one or more methods of the application.

12. The computer program product of claim 8, wherein the execution of the test application on the execution of the one or more methods of the application further comprises:
    determining one or more security roles associated with the Subject object based on the user identifier to security role mapping;
    determining one or more security role definitions associated with the invoked method;
    comparing the one or more security roles associated with the Subject object to the one or more security role definitions associated with the invoked method; and
    generating an output indicative of whether the Subject object has a necessary security role for invoking the invoked method based on results of the comparison.

13. The computer program product of claim 12, wherein the output is an exception indicating a security violation in response to the comparison indicating that the Subject object does not have an associated security role matching one of the one or more security role definitions.

14. The computer program product of claim 8, wherein the computer readable program causes the computing device to output a result of the execution of the test application on the execution of the one or more methods of the application by generating a log of attempted method invocations with associated indications of whether the method invocations resulted in a security role violation or not.

15. The computer program product of claim 8, wherein the computer readable program is stored in a computer readable storage medium in a data processing system and wherein the computer readable program was downloaded over a network from a remote data processing system.

16. An apparatus, comprising:
    a processor; and
    a memory coupled to the processor, wherein the memory comprises instructions which, when executed by the processor, cause the processor to:
    receive, in a container of a runtime environment, an application having one or more methods and one or more security role definitions associated with the one or more methods;
    receive, in the container, a properties object specifying a user identifier to security role mapping structure that maps a plurality of user identifiers to corresponding security roles, and one or more test user identifiers to use to test an execution of the one or more methods of the application;
    execute, in the container, a test application on the execution of the one or more methods of the application based on the user identifier to security role mapping structure in the properties object, the one or more test user identifiers in the properties object, and the security role definitions, wherein the test application tests an operation of the application with regard to the security role definitions by correlating the one or more test user identifiers with corresponding security roles using the user identifier to security role mapping structure and comparing the corresponding security roles of the one or more test user identifiers to the security role definitions associated with the one or more methods; and
    output a result of the execution of the test application on the execution of the one or more methods of the application, wherein the execution of the test application on the execution of the one or more methods of the application comprises:
    executing the application within the container;
    in response to a method, in the one or more methods, being invoked during the execution of the application, checking input properties from the properties object to determine if an invocation user identifier is supplied by the properties object; and
    in response to an invocation user identifier being supplied by the properties object, generating a Subject object prior to verification of the invocation user identifier.

* * * * *